United States Patent [19]

Bennett

[11] 3,859,630

[45] Jan. 7, 1975

[54] APPARATUS FOR DETECTING AND CORRECTING ERRORS IN DIGITAL INFORMATION ORGANIZED INTO A PARALLEL FORMAT BY USE OF CYCLIC POLYNOMIAL ERROR DETECTING AND CORRECTING CODES

[75] Inventor: Walter Scott Bennett, Diamond Bar, Calif.

[73] Assignee: Burroughs Corporation, Detroit, Mich.

[22] Filed: Jan. 29, 1973

[21] Appl. No.: 327,867

[52] U.S. Cl. .................. 340/146.1 AL

[51] Int. Cl. .................. H04l 1/10

[58] Field of Search .................. 340/146.1 AL

[56] References Cited

UNITED STATES PATENTS

| | | | |
|---|---|---|---|
| 2,596,199 | 5/1952 | Bennett | 340/146.1 AL |
| 3,245,033 | 4/1966 | Plouffe et al. | 340/146.1 AL |
| 3,398,400 | 8/1968 | Rupp et al. | 340/146.1 AL |
| 3,474,413 | 10/1969 | Dryden | 340/146.1 AL |
| 3,478,313 | 11/1969 | Srinivasan | 340/146.1 AL |
| 3,538,497 | 11/1970 | Harmon | 340/146.1 AV |
| 3,542,756 | 11/1970 | Gallager | 340/146.1 AL |

OTHER PUBLICATIONS

Peterson, W. W. et al.; Error–Correcting Codes, Cambridge, MIT Press, 1972, pp. 222–223 TK5102.5.P4

Gallager, R. G.; Information Theory and Reliable Communication, N.Y., J. Wiley & Sons, 1968, pp. 230–232 Q360.G3

Eggenberger, J. S.; A Class of Error–Correcting Codes with Simple Encodes and Decoders, IBM Tech. Disc. Bull. 9(11): April, 1967 pp. 1607–1612

*Primary Examiner*—Felix D. Gruber
*Assistant Examiner*—R. Stephen Dildine, Jr.
*Attorney, Agent, or Firm*—Albin H. Gess; N. Cass; E. G. Fiorito

[57] ABSTRACT

Single error and burst error correcting cyclic polynomial codes are inexpensively implemented by a parallel encoder and decoder. Heretofore, cyclic polynomial error correcting codes were feasibly implemented only in a serial fashion by a feed-back shift register type of encoder and decoder. Information channel protection apparatus that can encode serial format data serially and decode such data in parallel, as well as apparatus that can encode parallel format data in parallel and decode such data in serial fashion can be constructed relatively inexpensively by utilizing the parallel encoding and decoding apparatus for cyclic polynomial error correcting codes.

6 Claims, 12 Drawing Figures

| | PARALLEL ENCODER DATA INPUT | GENERATED CHECK BITS | RECEIVED ENCODED DATA WORD | PARALLEL DECODE ERROR CHECK BITS | ONE OF EIGHT DECODER OUTPUT | PARALLEL DECODER OUTPUT CORRECTED |
|---|---|---|---|---|---|---|
| | $I_1$ $I_2$ $I_3$ $I_4$ | $C_1$ $C_2$ $C_3$ | $C_1$ $C_2$ $C_3$ $I_1$ $I_2$ $I_3$ $I_4$ | $P_1$ $P_2$ $P_3$ | 0 1 2 3 4 5 6 7 | $C_1$ $C_2$ $C_3$ $I_1$ $I_2$ $I_3$ $I_4$ |
| $A_1$ | 1 0 0 0 | 1 0 1 | 1 0 1 1 0 0 0 | 0 0 0 | 1 0 0 0 0 0 0 0 | 1 0 1 1 0 0 0 |
| $A_2$ | 1 0 0 0 | 1 0 1 | 1 0 1 1 0 0 1 | 0 1 1 | 0 0 0 1 0 0 0 0 | 1 0 1 1 0 0 0 |
| $A_3$ | 1 0 0 0 | 1 0 1 | 1 0 1 1 0 1 0 | 1 1 0 | 0 0 0 0 0 0 1 0 | 1 0 1 1 0 0 0 |
| $A_4$ | 1 0 0 0 | 1 0 1 | 1 0 1 1 1 0 0 | 1 1 1 | 0 0 0 0 0 0 0 1 | 1 0 1 1 0 0 0 |
| $A_5$ | 1 0 0 0 | 1 0 1 | 1 1 1 1 0 0 0 | 0 1 0 | 0 0 1 0 0 0 0 0 | 1 0 1 1 0 0 0 |
| $B_1$ | 1 0 1 0 | 0 1 1 | 0 1 1 1 0 1 0 | 0 0 0 | 1 0 0 0 0 0 0 0 | 0 1 1 1 0 1 0 |
| $B_2$ | 1 0 1 0 | 0 1 1 | 0 1 1 1 0 1 1 | 0 1 0 | 0 0 0 1 0 0 0 0 | 0 1 1 1 0 1 0 |
| $B_3$ | 1 0 1 0 | 0 1 1 | 0 1 1 1 1 1 0 | 1 1 1 | 0 0 0 0 0 0 0 1 | 0 1 1 1 0 1 0 |
| $B_4$ | 1 0 1 0 | 0 1 1 | 0 1 1 0 0 1 0 | 1 0 1 | 0 0 0 0 0 1 0 0 | 0 1 1 1 0 1 0 |
| $B_5$ | 1 0 1 0 | 0 1 1 | 0 0 1 1 0 1 0 | 0 1 0 | 0 0 1 0 0 0 0 0 | 0 1 1 1 0 1 0 |

| | SERIAL ENCODER DATA INPUT | ENCODER FLIP/FLOP STATES $FF_{M1}$ $FF_{D2}$ $FF_{D3}$ | ENCODER OUTPUT | DEMULTIPLEXOR OUTPUT 0 1 2 3 4 5 6 7 | PARALLEL DECODE ERROR CHECK BITS $P_1$ $P_2$ $P_3$ | ONE OF EIGHT DECODER OUTPUT 0 1 2 3 4 5 6 7 | PARALLEL DECODER OUTPUT CORRECTED $C_1$ $C_2$ $C_3$ $I_1$ $I_2$ $I_3$ $I_4$ |
|---|---|---|---|---|---|---|---|
| $A_1$ | 1 $I_1$<br>0 $I_2$<br>0 $I_3$<br>0 $I_4$<br>$t_c$ 0<br>0<br>0 | 0 0 0<br>1 1 0<br>0 1 1<br>1 1 1<br>1 0 1<br>0 1 0<br>0 0 1<br>0 0 0 | 1 $I_1$<br>0 $I_2$<br>0 $I_3$<br>0 $I_4$<br>1 $C_1$<br>0 $C_2$<br>1 $C_3$ | 1 0 1 1 0 0 0 | 0 0 0 | 1 0 0 0 0 0 0 0 | 1 0 1 1 0 0 0 |
| $A_2$ | 1 $I_1$<br>0 $I_2$<br>0 $I_3$<br>0 $I_4$<br>$t_c$ 0<br>0<br>0 | 0 0 0<br>1 1 0<br>0 1 1<br>1 1 1<br>1 0 1<br>0 1 0<br>0 0 1<br>0 0 0 | 1 $I_1$<br>0 $I_2$<br>0 $I_3$<br>1 $I_4$<br>1 $C_1$<br>0 $C_2$<br>1 $C_3$ | 1 0 1 1 0 0 1 | 0 1 1 | 0 0 0 1 0 0 0 0 | 1 0 1 1 0 0 0 |
| $B_1$ | 1 $I_1$<br>0 $I_2$<br>1 $I_3$<br>0 $I_4$<br>$t_c$ 0<br>0<br>0 | 0 0 0<br>1 1 0<br>0 1 1<br>0 0 1<br>1 1 0<br>0 1 1<br>0 0 1<br>0 0 0 | 1 $I_1$<br>0 $I_2$<br>1 $I_3$<br>0 $I_4$<br>0 $C_1$<br>1 $C_2$<br>1 $C_3$ | 0 1 1 1 0 1 0 | 0 0 0 | 1 0 0 0 0 0 0 0 | 0 1 1 1 0 1 0 |
| $B_2$ | 1 $I_1$<br>0 $I_2$<br>1 $I_3$<br>0 $I_4$<br>$t_c$ 0<br>0<br>0 | 0 0 0<br>1 1 0<br>0 1 1<br>0 0 1<br>1 1 0<br>0 1 1<br>0 0 1<br>0 0 0 | 1 $I_1$<br>1 $I_2$<br>1 $I_3$<br>0 $I_4$<br>0 $C_1$<br>1 $C_2$<br>1 $C_3$ | 0 1 1 1 1 1 0 | 1 1 1 | 0 0 0 0 0 0 0 1 | 0 1 1 1 0 1 0 |

FIG. 1

FIG. 9

| PARALLEL ENCODER DATA INPUT | | | | GENERATED CHECK BITS | | | RECEIVED ENCODED DATA WORD | | | | | | | MULTIPLEXOR OUTPUT | | | DECODER FLIP/FLOP STATES (Q) | | | DECODER REGISTER CONTENTS | | | | | | |
|---|---|---|---|---|---|---|---|---|---|---|---|---|---|---|---|---|---|---|---|---|---|---|---|---|---|---|
| | | | | | | | | | | | | | | | | | | | | 1 | 2 | 3 | 4 | 5 | 6 | 7 |
| $I_1$ | $I_2$ | $I_3$ | $I_4$ | $C_1$ | $C_2$ | $C_3$ | $C_1$ | $C_2$ | $C_3$ | $I_1$ | $I_2$ | $I_3$ | $I_4$ | | | | $FFJ_1$ | $FFK_2$ | $FFL_3$ | $C_3$ | $C_2$ | $C_1$ | $I_4$ | $I_3$ | $I_2$ | $I_1$ |
| 1 | 0 | 0 | 0 | 1 | 0 | 1 | 1 | 0 | 1 | 1 | 0 | 0 | 0 | | 1 | $I_1$ | 0 | 0 | 0 | 0 | 0 | 0 | 0 | 0 | 0 | 0 |
| | | | | | | | | | | | | | | | 0 | $I_2$ | 1 | 1 | 0 | 1 | 0 | 0 | 0 | 0 | 0 | 0 |
| | | | | | | | | | | | | | | | 0 | $I_3$ | 0 | 1 | 1 | 0 | 1 | 0 | 0 | 0 | 0 | 0 |
| | | | | | | | | | | | | | | | 0 | $I_4$ | 1 | 1 | 1 | 0 | 0 | 1 | 0 | 0 | 0 | 0 |
| | | | | | | | | | | | | | | $t_c$ | 1 | $C_1$ | 1 | 0 | 1 | 0 | 0 | 0 | 1 | 0 | 0 | 0 |
| | | | | | | | | | | | | | | | 0 | $C_2$ | 0 | 1 | 0 | 1 | 0 | 0 | 0 | 1 | 0 | 0 |
| | | | | | | | | | | | | | | | 1 | $C_3$ | 0 | 0 | 1 | 0 | 1 | 0 | 0 | 0 | 1 | 0 |
| | | | | | | | | | | | | | | $t_L$ | | | 0 | 0 | 0 | 1 | 0 | 1 | 0 | 0 | 0 | 1 |
| 1 | 0 | 0 | 0 | 1 | 0 | 1 | 1 | 0 | 1 | 1 | 0 | 0 | 1 | | 1 | $I_1$ | 0 | 0 | 0 | 0 | 0 | 0 | 0 | 0 | 0 | 0 |
| | | | | | | | | | | | | | | | 0 | $I_2$ | 1 | 1 | 0 | 1 | 0 | 0 | 0 | 0 | 0 | 0 |
| | | | | | | | | | | | | | | | 0 | $I_3$ | 0 | 1 | 1 | 0 | 1 | 0 | 0 | 0 | 0 | 0 |
| | | | | | | | | | | | | | | | 1 | $I_4$ | 1 | 1 | 1 | 0 | 0 | 1 | 0 | 0 | 0 | 0 |
| | | | | | | | | | | | | | | $t_c$ | 1 | $C_1$ | 0 | 1 | 1 | 1 | 0 | 0 | 1 | 0 | 0 | 0 |
| | | | | | | | | | | | | | | | 0 | $C_2$ | 0 | 0 | 1 | 1 | 1 | 0 | 0 | 1 | 0 | 0 |
| | | | | | | | | | | | | | | | 1 | $C_3$ | 1 | 1 | 0 | 0 | 1 | 1 | 0 | 0 | 1 | 0 |
| | | | | | | | | | | | | | | $t_L$ | | | 1 | 0 | 1 | 1 | 0 | 1 | 1 | 0 | 0 | 1 |
| | | | | | | | | | | | | | | | | | 1 | 0 | 0 | 1 | 1 | 0 | 1 | 1 | 0 | 0 |
| | | | | | | | | | | | | | | | | | 0 | 1 | 0 | 0 | 1 | 1 | 0 | 1 | 1 | 0 |
| | | | | | | | | | | | | | | $t_e$ | | | 0 | 0 | 1 | 0 | 0 | 1 | 1 | 0 | 1 | 1 |
| | | | | | | | | | | | | | | | | | 0 | 0 | 0 | 0 | 0 | 0 | 1 | 1 | 0 | 1 |
| | | | | | | | | | | | | | | | | | 0 | 0 | 0 | 1 | 0 | 0 | 0 | 1 | 1 | 0 |
| | | | | | | | | | | | | | | | | | 0 | 0 | 0 | 0 | 1 | 0 | 0 | 0 | 1 | 1 |
| | | | | | | | | | | | | | | | | | 0 | 0 | 0 | 1 | 0 | 1 | 0 | 0 | 0 | 1 |

FIG. 10

| PARALLEL ENCODER DATA INPUT $I_1$ | $I_2$ | $I_3$ | $I_4$ | GENERATED CHECK BITS $C_1$ | $C_2$ | $C_3$ | RECEIVED ENCODED DATA WORD $C_1$ | $C_2$ | $C_3$ | $I_1$ | $I_2$ | $I_3$ | $I_4$ | MULTIPLEXOR OUTPUT | | | DECODER FLIP/FLOP STATES (Q) $FF_{J_1}$ | $FF_{K_2}$ | $FF_{L_3}$ | DECODER REGISTER CONTENTS 1 $C_3$ | 2 $C_2$ | 3 $C_1$ | 4 $I_4$ | 5 $I_3$ | 6 $I_2$ | 7 $I_1$ |
|---|---|---|---|---|---|---|---|---|---|---|---|---|---|---|---|---|---|---|---|---|---|---|---|---|---|---|
| 1 | 0 | 1 | 0 | 0 | 1 | 1 | 0 | 1 | 1 | 1 | 0 | 1 | 0 | | 1 | $I_1$ | 0 | 0 | 0 | 0 | 0 | 0 | 0 | 0 | 0 | 0 |
| | | | | | | | | | | | | | | | 0 | $I_2$ | 1 | 1 | 0 | 1 | 0 | 0 | 0 | 0 | 0 | 0 |
| | | | | | | | | | | | | | | | 1 | $I_3$ | 0 | 1 | 1 | 0 | 1 | 0 | 0 | 0 | 0 | 0 |
| | | | | | | | | | | | | | | | 0 | $I_4$ | 0 | 0 | 1 | 1 | 0 | 1 | 0 | 0 | 0 | 0 |
| | | | | | | | | | | | | | | $t_c$ | 0 | $C_1$ | 1 | 1 | 0 | 0 | 1 | 0 | 1 | 0 | 0 | 0 |
| | | | | | | | | | | | | | | | 1 | $C_2$ | 0 | 1 | 1 | 0 | 0 | 1 | 0 | 1 | 0 | 0 |
| | | | | | | | | | | | | | | | 1 | $C_3$ | 0 | 0 | 1 | 1 | 0 | 0 | 1 | 0 | 1 | 0 |
| | | | | | | | | | | | | | | $t_L$ | | | 0 | 0 | 0 | 1 | 1 | 0 | 0 | 1 | 0 | 1 |
| 1 | 0 | 1 | 0 | 0 | 1 | 1 | 0 | 1 | 1 | 1 | 1 | 1 | 0 | | 1 | $I_1$ | 0 | 0 | 0 | 0 | 0 | 0 | 0 | 0 | 0 | 0 |
| | | | | | | | | | | | | | | | 1 | $I_2$ | 1 | 1 | 0 | 1 | 0 | 0 | 0 | 0 | 0 | 0 |
| | | | | | | | | | | | | | | | 1 | $I_3$ | 1 | 0 | 1 | 1 | 1 | 0 | 0 | 0 | 0 | 0 |
| | | | | | | | | | | | | | | | 0 | $I_4$ | 0 | 1 | 0 | 1 | 1 | 1 | 0 | 0 | 0 | 0 |
| | | | | | | | | | | | | | | $t_c$ | 0 | $C_1$ | 0 | 0 | 1 | 0 | 1 | 1 | 1 | 0 | 0 | 0 |
| | | | | | | | | | | | | | | | 1 | $C_2$ | 1 | 1 | 0 | 0 | 0 | 1 | 1 | 1 | 0 | 0 |
| | | | | | | | | | | | | | | | 1 | $C_3$ | 1 | 0 | 1 | 1 | 0 | 0 | 1 | 1 | 1 | 0 |
| | | | | | | | | | | | | | | $t_L$ | | | 0 | 1 | 0 | 1 | 1 | 0 | 0 | 1 | 1 | 1 |
| | | | | | | | | | | | | | | $t_e$ | | | 0 | 0 | 1 | 1 | 1 | 1 | 0 | 0 | 1 | 1 |
| | | | | | | | | | | | | | | | | | 0 | 0 | 0 | 0 | 1 | 1 | 1 | 0 | 0 | 1 |
| | | | | | | | | | | | | | | | | | 0 | 0 | 0 | 1 | 0 | 1 | 1 | 1 | 0 | 1 |
| | | | | | | | | | | | | | | | | | 0 | 0 | 0 | 0 | 1 | 0 | 1 | 1 | 1 | 0 |
| | | | | | | | | | | | | | | | | | 0 | 0 | 0 | 1 | 0 | 1 | 0 | 1 | 1 | 1 |
| | | | | | | | | | | | | | | | | | 0 | 0 | 0 | 1 | 1 | 0 | 1 | 0 | 1 | 1 |
| | | | | | | | | | | | | | | | | | 0 | 0 | 0 | 0 | 1 | 1 | 0 | 1 | 0 | 1 |

| | DATA BITS INPUT $I_6 I_5 I_4 I_3 I_2 I_1$ | CHK. BITS GENERATED ROM #A $C_6 C_5 C_4 C_3 C_2 C_1$ | ENCODED WORD $C_6 C_5 C_4 C_3 C_2 C_1 I_6 I_5 I_4 I_3 I_2 I_1$ | REC'D CHECK BITS $R_{12} R_{11} R_{10} R_9 R_8 R_7$ | REC'D DATA BITS $R_6 R_5 R_4 R_3 R_2 R_1$ |
|---|---|---|---|---|---|
| 1 | 000101 | 000101 | 000101000101 | 000101 | 000101 |
| 2 | 000101 | 000101 | 000101000101 | 000101 | 100101 |
| 3 | 000101 | 000101 | 000101000101 | 001101 | 000101 |
| 4 | 000101 | 000101 | 000101000101 | 000101 | 011101 |
| 5 | 000101 | 000101 | 000101000101 | 001001 | 000101 |
| 6 | 000101 | 000101 | 000101000101 | 001101 | 100101 |

| | DECODE CHK. BITS ROM #B $D_6 D_5 D_4 D_3 D_2 D_1$ | ERROR CHK. BITS COMPARISON CKT $P_6 P_5 P_4 P_3 P_2 P_1$ | ERROR CORRECTION PATTERN ROM #C 12 11 10 9 8 7 6 5 4 3 2 1 | CORRECTED CODEWORD OUTPUT $R_{12} R_{11} R_{10} R_9 R_8 R_7 R_6 R_5 R_4 R_3 R_2 R_1$ |
|---|---|---|---|---|
| 1 | 000101 | 000000 | 000000000000 | 000101000101 |
| 2 | 111110 | 111011 | 000000100000 | 000101000101 |
| 3 | 000101 | 001000 | 001000000000 | 000101000101 |
| 4 | 110000 | 110101 | 000000011000 | 000101000101 |
| 5 | 000101 | 001100 | 001100000000 | 000101000101 |
| 6 | 111110 | 110011 | 111111111111 | UNCORRECTABLE ERROR |

FIG. 12

APPARATUS FOR DETECTING AND CORRECTING ERRORS IN DIGITAL INFORMATION ORGANIZED INTO A PARALLEL FORMAT BY USE OF CYCLIC POLYNOMIAL ERROR DETECTING AND CORRECTING CODES

BACKGROUND OF THE INVENTION

The present invention relates generally to improvements in apparatus for information channel error protection wherein the information channel includes a device or subsystem which, in the absence of error, performs upon the data presented to it, either an identity transformation (direct transfer), or an identity transformation with delay (transfer plus storage), and more particularly pertains to new and improved data encoding and decoding apparatus wherein data being presented to an information channel is encoded according to the dictates of a generating polynomial, $g(X)$, that describes the particular code chosen out of the class of cyclic codes, for the encoding process and the decoding process.

In the field of information channel protection apparatus, it has been the practice to employ serial feedback shift registers to implement cyclic polynomial codes for performing the encoding of data to be inserted into an information channel and the decoding of information received from the channel. The prior art has recognized that such serial implemented encoding and decoding structure processes the data quite slowly and attempts have been made to speed such processes up by a hybrid serial-parallel encoding/decoding apparatus which basically consists of a parallel input parallel feed-back shift register. The following prior art patents illustrate the prior art embodiments for such hybrid cyclic code encoders and decoders: U.S. Pat. Nos. 3,162,837 (Dec. 12, 1964), 3,465,287 (Sept. 2, 1969), 3,601,800 (Aug. 24, 1971), and 3,622,985 (Nov. 23, 1971). These patents are an example of prior art attempts to implement cyclic type codes in a more expeditious and economical manner. While attaining a more time efficient structure, all of these attempts, without exception, still require some type of serial shifting procedure which requires a shift register apparatus, both at the encoding and the decoding stations. Shift registers are inherently slow.

SUMMARY OF THE INVENTION

Accordingly, it is an object of this invention to provide for an encoding/decoding apparatus that can inexpensively and efficiently encode/decode digital data according to the dictates of cyclic polynomial codes, in a totally parallel manner, without the use of shift register apparatus.

A further object of this invention is to provide inexpensive and uncomplicated channel protection apparatus that can encode digital data serially and decode it in parallel, and vice versa.

The foregoing objects and the general purpose of this invention are accomplished by implementing cyclic polynomial, single error and burst error correcting and detecting, codes in a totally parallel encoder and decoder network. The parallel encoder and decoder networks are constructed to operate on the data bits to be submitted to an information channel in a manner that is identical to the operation that would be performed on such data by an $(n-k)$ borrow-free division shift register encoder/decoder which is structured in accordance with the dictates of the generating polynomial of the particular cyclic code to be utilized. The basic cycle of the so structured shift register dictates the structure of the equivalent parallel encoder/decoder network.

BRIEF DESCRIPTION OF THE DRAWINGS

Other objects and many of the attendant advantages of this invention will be readily appreciated as the same becomes understood by reference to the following detailed description when considered in conjunction with the accompanying drawings in which like reference to numerals designate like parts throughout the figures thereof and wherein:

FIG. 7 is a state diagram illustrating the functions of the structure of FIG. 6 in response to several different data words.

FIG. 9 is a state diagram illustrating the functions of the structure of FIG. 8 in response to a certain data word.

FIG. 10 is a state diagram illustrating the functions of the structure of FIG. 8 in response to a different data word from that shown in FIG. 9.

FIG. 12 is a state diagram illustrating the functions of the structure of FIG. 11 in response to a certain data word to be transferred.

DESCRIPTION OF THE PREFERRED EMBODIMENT

Figures 1, 5:
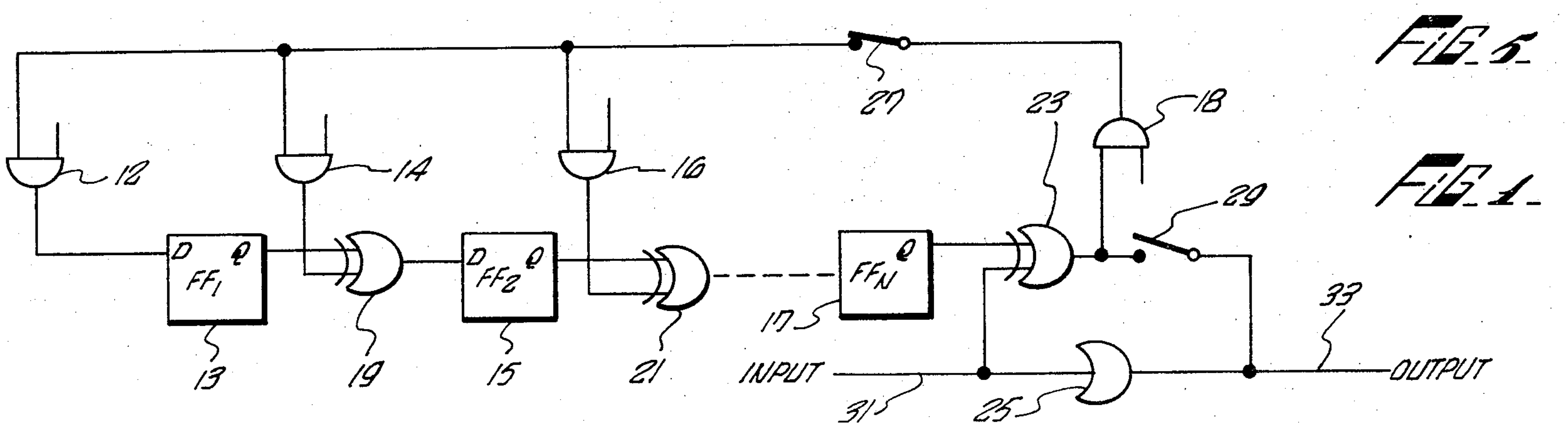
FIG. 1 is a block diagram of a generalized form of $(n-k)$ shift register that can be utilized to encode and decode data in accordance with the dictates of any cyclic code.
FIG. 5 is a state diagram illustrating the functions of the structures of FIG. 4 in response to several different data words.

In order to facilitate the understanding and appreciation of the present invention, a brief discussion of the prior art techniques for error detection and correction will be undertaken before describing the preferred embodiments of the present invention. Messages that are transmitted through transfer channels or, transfer channels with delay (or storage) used in present data digital computer systems, are often made up of a pattern of individual signals called bits that can be either of two values, for example, two distinguishable voltage levels which are for convenience called one and zero. These ones and zeros can be conveniently manipulated according to the rules of binary algebra that are well known in the art.

Error detection and correction is necessitated when using the above channels because the channels sometime introduce errors into a message passing through them, which may be one bit or several bits long. An example of such an error is a bit being a "1" instead of a "0" as intended. Without a system of error detection, the error message would be interpreted simply as a different but valid message. The primary aim of an error detecting system therefore, is to make a message containing an error easily distinguishable from a valid message, a secondary aim being to correct the bit or bits in error. This is accomplished by transmitting check bits along with the data bits. A circuit called an encoder receives the data bits at the sending station and generates the appropriate check bits. At the receiving station, a decoder operates on the received check and data bits to determine whether a valid message or a message containing an error has been received. To provide for the correction function, additional circuitry is added to analyze the check bit pattern received and identify the bit position or positions in the received message in error.

The mathematical relationship between the check bits and the data bits of a message is determined by the specific code out of a class of codes chosen to be implemented. The class of codes with which the present invention is concerned is the cyclic class of codes, as differentiated from the linear class of codes. These two classes of codes may be elementarily defined as follows. Assuming that a binary code of length n is a subset of the set of all binary $n$ - tuples or $n$ component vectors, each component of which is either zero or one, each $n$ - tuple in such a code is called a code word of that code. A binary code is linear if the vector sum (modulo two) of any two code words is also a code word. A binary code if cyclic if a code word of that code can be shifted end-around so that the last component of such code word is the first component and such new arrangement of components also represents a binary code word. The remainder of this discussion will be concerned exclusively with the class of codes known as cyclic polynomial codes.

The prior art, in using cyclic polynomial codes, has found it convenient to represent binary messages in the form of a polynomial generally expressed as:

$$b_n x^n \oplus b_{n-1} x^{n-1} \oplus b_{n-2} x^{n-2} \oplus \ldots b_1 x \oplus bx^\circ$$

Each subscripted letter $b$ is a coefficient of a term of the polynomial corresponding to the one or zero that actually makes up the message. The subscript represents its position. To encode this message several prior art techniques have been used. One of which is to multiply the data polynomial by the code generating polynomial according to the rules of "carry-free" multiplication. Such an encoding technique produces a non-separable coded message which requires complete "borrow-free division decoding" to obtain a quotient. Borrow-free division decoding simply consists of dividing the received encoded message by the generating polynomial according to the rules of "borrow-free division."

Another technique is to divide the data polynomial by the code generating polynomial according to the rules of borrow-free division. This is called "borrow-free division encoding." If borrow-free division encoding is utilized, a separable code word is generated, which means that the data bits are not intermixed with the check bits. Such an encoded message will be just as easily decoded by borrow-free division decoding. All further discussion will be concerned only with the borrow-free division encoding and decoding procedure. A more thorough explanation of that procedure may be obtained from *Error Correcting Codes* by W. Wesley Peterson, published by the MIT Press (1961), pgs. 149 to 151.

Referring now to FIG. 1 which illustrates the general form of a shift register borrow-free division encoder, the elements of the encoder basically, are an $(n-k)$ stage feed-back shift register with a modulo two summer (exclusive OR gate) between each stage of the shift register. In all further discussion, $n$ stands for the number of bits in an encoded data word or message, the letter $k$ stands for the number of data or information bits in a message, and the letter $r$ stands for the number of check bits in a message. This general encoder will operate according to a generating polynomial $g(x)$ of the form:

$$g(x) = x^r \oplus b_r{-}1x^{r-1} \oplus b_r{-}2x^{r-2} \oplus \ldots b_1 x \oplus 1$$

The coefficients $b_1$ to $b_{r-1}$ are either one or zero depending upon the particular cyclic code chosen. The value of these coefficients determine one of the inputs to the AND gates 12, 14, 16, 18 in the feed-back path of the $(n-k)$ shift register encoder. The flip-flops 13, 15 and 17 that make up the register are standard D-type flip-flops. The exclusive OR gates 19, 21 and 23 are also standard. The OR gate 25 in the output path of the $(n-k)$ stage register encoder acts as an isolator. Switches 29 and 27 initially assume the states shown that are operated at the conclusion of an encoding cycle as will be hereinafter explained.

Let us assume for the purposes of example that the particular code chosen is represented by the encoding polynomial:

$$g(x) = x^3 \oplus x \oplus 1$$

which has coefficients $d$ of 1 0 1 1. These coefficients are obtained in the following manner. The general expression of an encoding polynomial is:

$$g(x) = b_r\, x^r \oplus b_r{-}1x^{r-1} \oplus b_r - 2x^{r-2} \oplus \ldots b_1 x \oplus 1$$

From the particular code chosen, $k = 4$, $n = 7$, and $n-k = 3 = r$. Thus, one of the specific forms of the generating polynomial is:

$$g(x) = 1x^3 \oplus 0x^2 \oplus 1x \oplus 1,$$

hence 1 0 1 1. In consequence, the input to AND gate 18 will be a "binary one." The input to AND gate 16 will be a "binary zero." The input to AND gate 14 will be a "binary one." The input to AND gate 12 will be a "binary one."

If this generating polynomial is to be used continuously, the general encoder circuit of FIG. 1 may be simplified by eliminating the AND gates and substituting in their place a straight-through path wherever the input to the AND gate is a "binary one" or, an open circuit wherever the input to the AND gate is a "binary zero." Thus, AND gate 18 may be replaced by a straight path; AND gate 16 may be removed; AND gate 14 may be replaced by a straight path; and AND gate 12 may be replaced by a straight path. This equivalent circuit is shown as the encoder 57 in FIG. 2. The operation of such an encoder and decoder in response to specific data words will hereinafter be explained in connection with the apparatus of FIG. 2.

For the present however, the general function of such an encoder will be explained with reference to FIG. 1. The operation of the encoder is dictated by an $(n,k)$ cyclic code where $$n = 7 \text{ and } k = 4.$$

Assuming that $k$ data bits $I_1$, $I_2$, $I_3$, $I_4$ are to be encoded by the encoder of FIG. 1, they are supplied to the encoder by its input line 31. During this data input phase, switch 29 is open and switch 27 is closed. As the first data bit $I_1$ is supplied to the $(n-k)$ shift register, it also appears on the output line 33 of the register. The outputs of the flip-flops 13, 15, and 17 of the $(n-k)$ register in response to the data bits $I_1$, $I_2$, $I_3$, $I_4$ will be represented by the following table when the initial state is zero.

| | | | |
|---|---|---|---|
| 0 | 0 | 0 | $I_1$ |
| $I_1$ | $I_1$ | 0 | $I_2$ |
| $I_2$ | $I_1\oplus_2$ | $I_1$ | $I_3$ |
| $I_1 \oplus I_3$ | $I_1 \oplus I_2 \oplus I_3$ | $I_1 \oplus I_2$ | $I_4$ |
| $I_1 \oplus I_2 \oplus I_4$ | $I_2 \oplus I_3 \oplus I_4$ | $I_1 \oplus I_2 \oplus I_3$ | — |

After the last data bit $I_4$ has been received by the encoder of FIG. 1, the contents or the output of the flip-flops 13, 15, and 17 are as follows. Flip-flop 17 represents $I_1 \oplus I_2 \oplus I_3$. Flip-flop 15 represents $I_2 \oplus I_3 \oplus I_4$. Flip-flop 13 represents $I_1 \oplus I_2 \oplus I_4$. With this type shift register encoder, the residue remaining in the shift register stages after all data bits have been entered represent the check bits for the data bits entered. The encoded data word is formed simply by appending the check bits to the data bits by closing switch 29, opening switch 27 and shifting the three check bits out on line 33. If the flip-flops are labelled $C_1$, $C_2$ and $C_3$ from right to left, then it can be seen that for the specific (7,4) code the general check bit equations are:

$C_1 = I_1 \oplus I_2 \oplus I_3$ $C_2 = I_2 \oplus I_3 \oplus I_4$ $C_3 = I_1 \oplus I_2 \oplus I_4$ The symbol $\oplus$ represents modulo two summation.

The general form of the encoded message, is $C_3\ C_2\ C_1\ I_4\ I_3\ I_2\ I_1$.

To decode this encoded message the equivalent network may be utilized to divide the received message by the generating polynomial $$g(x) = X^3 \oplus X \oplus 1.$$

Feeding this general seven bit binary word into the network of FIG. 1 results in the following states for flip-flops 13, 15, and 17.

| | | | |
|---|---|---|---|
| 0 | 0 | 0 | $I_1$ |
| $I_1$ | $I_1$ | 0 | $I_2$ |
| $I_2$ | $I_1 \oplus I_2$ | $I_1$ | $I_3$ |
| $I_1 \oplus I_3$ | $I_1 \oplus I_2 \oplus I_3$ | $I_1 \oplus I_2$ | $I_4$ |
| $I_1 \oplus I_2 \oplus I_4$ | $I_2 \oplus I_3 \oplus I_4$ | $I_1 \oplus I_2 \oplus I_3$ | $C_1$ |
| $C_1 \oplus I_1 \oplus I_2 \oplus I_3$ | $C_1 \oplus I_3 \oplus I_4$ | $I_2 \oplus I_3 \oplus I_4$ | $C_2$ |
| $C_1 \oplus I_2 \oplus I_3 \oplus I_4$ | $C_1 \oplus C_2 \oplus I_1 \oplus I_4$ | $C_1 \oplus I_3 \oplus I_4$ | $C_3$ |
| $C_1 \oplus C_3 \oplus I_3 \oplus I_4$ | $C_1 \oplus C_2 \oplus C_3 \oplus I_2$ | $C_1 \oplus C_2 \oplus I_1 \oplus I_4$ | — |

After the seven bit general word has been entered into this network, the contents of each of the flip-flops 17, 15, and 13 represent a certain combination of check bits $C$ and information bits $I$. For convenience, labelling flip-flop 17, $P_1$, flip-flop 15, $P_2$, and flip-flop 13, $P_3$, the contents of the flip-flops will be:

$P_1 = C_1 \oplus I_1 \oplus I_2 \oplus I_3$ $P_2 = C_2 \oplus I_2 \oplus I_3 \oplus I_4$ $P_3 = C_3 \oplus I_1 \oplus I_2 \oplus I_4$ During the decoding operation therefore, the contents of this $(n-k)$ feed-back shift register generates the error checking equations.

Figure 2:
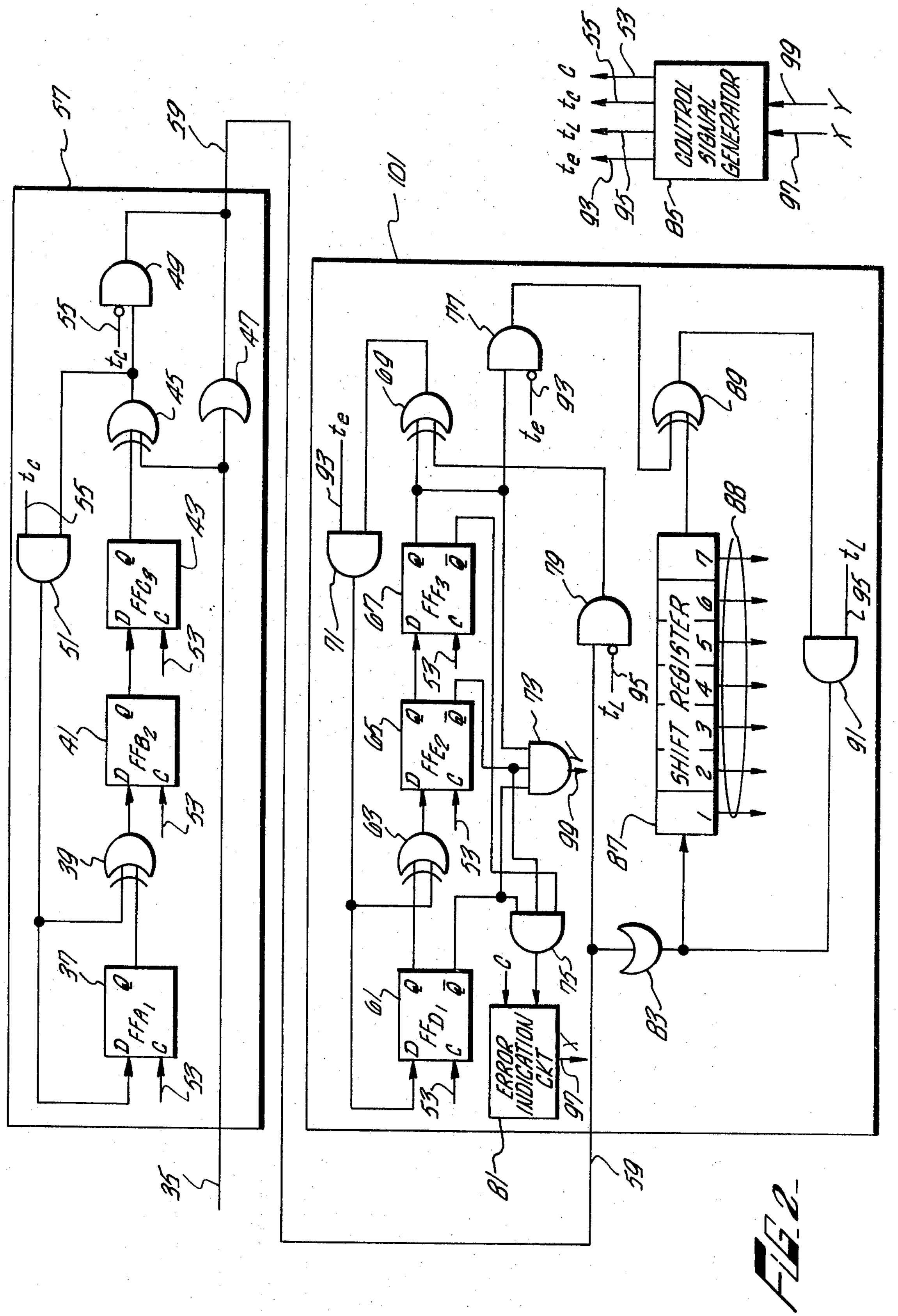
FIG. 2 is a block diagram of specific channel protection apparatus for a serial transfer channel that implements a specific cyclic code by an $(n-k)$ feed-back shift register.

The practical effect, as will be illustrated in connection with FIG. 2, is that if a no error seven bit encoded data word has been received, the residue in the flip-flops, after the seven bit word has been processed, will be zero. However, if an error has occurred there will be a non-zero residue, the pattern of which defines the particular bit in error. These check bit and error check bit generating equations that are defined by the inherent operation of the $(n-k)$ feed-back shift register can be utilized to structure an equivalent totally parallel implementation in a manner that will be hereinafter explained in connection with FIG. 4.

Referring now to FIG. 2, $(n-k)$ shift register encoder 57 for the generating polynomial $$g(x) = X^3 \oplus X \oplus 1$$

and the decoder for the same generating polynomial is shown utilized in a channel protection apparatus for a serial transfer channel 59. The data bits to be encoded are submitted to the encoder 57 over line 35. During the time that data bits are being submitted to the encoder 57, the control signal generator 85 is generating a "binary one" output signal at its *tc* output line 55 causing the signal being supplied to AND gate 49 to be a "binary zero" and the signal being supplied to AND gate 51 to be a "binary one," in effect causing AND gate 49 to operate as an open switch and AND gate 51 to operate as a closed switch. As the data bits are presented to the encoder 57, they are placed into the channel 59 through OR gate 47 which acts as a feed-back isolator whenever AND gate 49 is enabled.

The individual data bits, as they are supplied to the encoder 57, are modulo two summed by exclusive OR gate 45 with the output of $FF_{C_3}$ flip-flop 43, which sum is fed back through AND gate 51 to the input of $FF_{A_1}$ flip-flop 37 and exclusive OR gate 39 which modulo two sums the output of $FF_{A_1}$ flip-flop 37 with the particular feed-back signal. The flip-flops 37, 41 and 43 are clocked by control signal generator 85 over the clock line 53. Thus, after the first data bit is received the flip-flops are clocked and change state according to their inputs.

Referring now to the decoder 101 at the opposite end of the identity transformation channel 59, it can be seen that the decoder is essentially equivalent structurally to the encoder 57 in that it has three, or $(n-k) = r$ flip-flops 61, 65, and 67, two exclusive OR gates 63, and 69 placed identically as the exclusive OR gates of the encoder, and AND gate 71 in the feed-back loop of the register functioning as an ON and OFF switch. The other additional logic circuitry in the decoder 101 is needed to broadcast the occurrence of an error if such occurs and to correct such error if a correctable error occurs.

Upon having received a seven bit encoded word the outputs $Q$ of the flip-flops 61, 65, and 67, as was illustrated in connection with the general form apparatus of FIG. 1, will be zero if the received message had no errors. In such case then, the $\bar{Q}$ outputs of flip-flops 61, 65, and 67 will be a "binary one" causing AND gate 75 to produce an output that triggers error indication circuitry 81 to broadcast no error. Whereupon, the error indication circuit 81 generates a signal X on line 97 that is sent to the control signal generator 85 telling it that shift register 87 contains an error free received message. It can be seen from the structure of the decoder as the data bits are received on line 59, they serially pass through OR gate 83 into shift register 87.

If however, an error had occurred, whereupon the Q outputs of the flip-flops 61, 65, and 67 would not all be zero, the control signal generator 85 upon not having received a no error indication X over line 97 will after the seventh data bit generate an enabling signal $t_L$ over line 95 to AND gate 79 and AND gate 91, in effect causing AND gate 79 to act as an open switch and AND gate 91 to act as a closed switch. This causes the flip-flops 61, 65, and 67 of the decoder to continue shifting their data contents and causes shift register 87 to start shifting its data contents end-around through exclusive OR gate 89 and AND gate 91 back to its input stage 1. This continues until the $Q$ outputs of the flip-flops 61, 65, and 67 are 0 0 1 respectively, which indicates that the next bit to be shifted out of the shift register 87 is the bit in error.

This 0 0 1 state is detected by AND gate 73 which generates an output Y on line 99 to control signal generator 85, causing it to generate a signal $t_e$ on line 93 which enables AND gate 77 and disenables AND gate 71. At the next clock time, therefore, AND gate 77 has an output which is modulo two summed with the bit output of shift register 87 at such time, thereby changing such bit from a "1" to a "0" or a "0" to a "1" as it is fed around back into the first stage (1) of the shift register 87. The end-around shifting to the content of the shift register 87 is continued for the remaining $n$, in this case 7, clock times, whereupon the shifting is stopped by the control signal generator. At this time, the shift register content reflects the correct check bits located in the first three stages and the correct data bits in the last four stages. This message may then be removed from the shift register by way of lines 88 in a parallel fashion or serially shifted out. If a serial output is desired from the register, it must be slightly modified in a manner well known in the art which will not be here disclosed. It should be remembered that FIG. 2 illustrates one of the possible structures that may be used to implement a (7,4) cyclic code for purpose of example only, and that any $(n,k)$ code may be so implemented. Circuitry for accomplishing the functions of the control signal generator are seen as obvious to those skilled in the art and not a part of the present invention.

Figure 3:
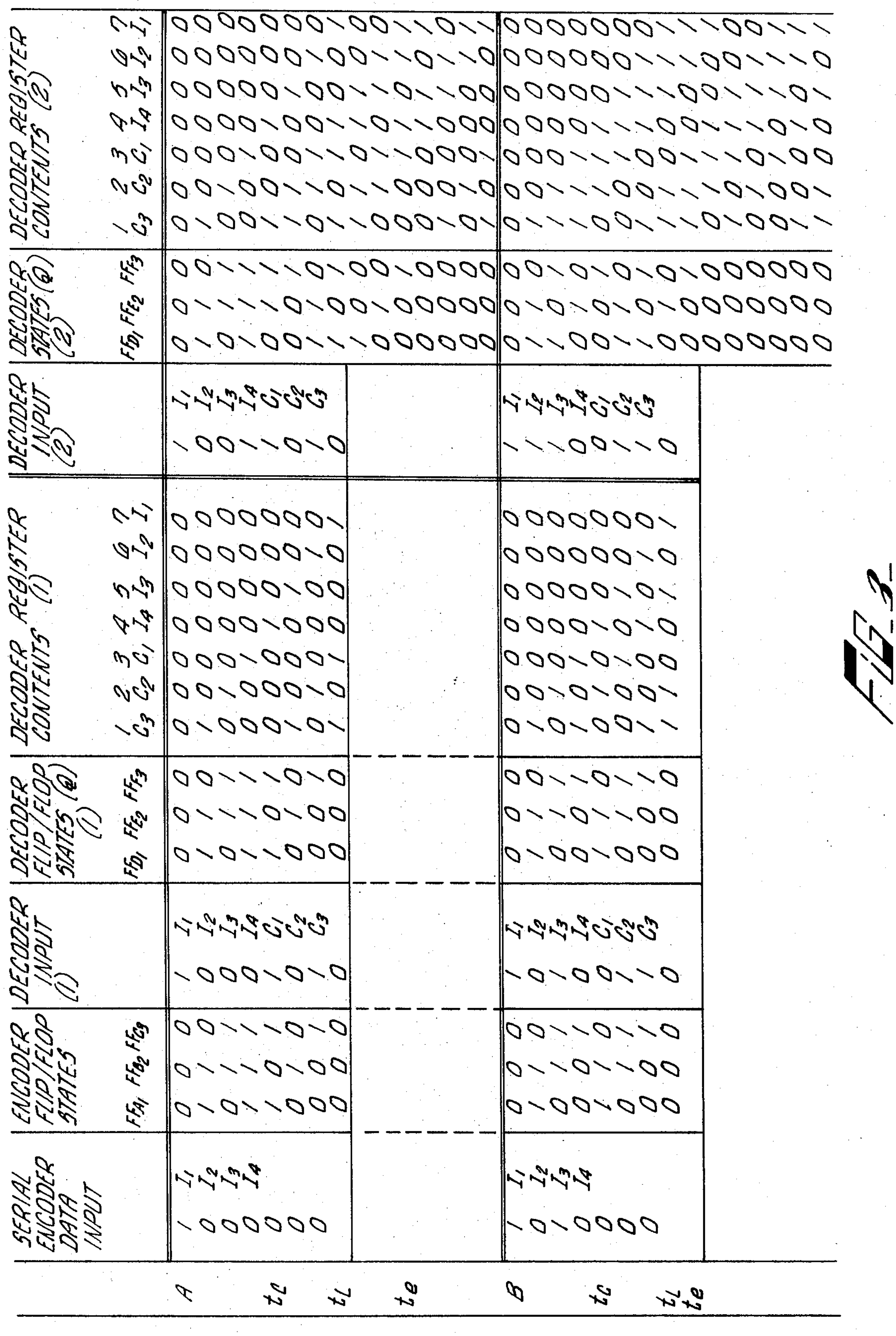
FIG. 3 is a state diagram illustrating several examples of the function of the structure of FIG. 2 during data transfer, in response to different data words.

Referring now to FIG. 3 which illustrates two specific examples of information transfer by the apparatus of FIG. 2, example A(1) illustrates the situation wherein data bits 1 0 0 0 are to be encoded by the encoder 57 (FIG. 2). At time $t_o$, before the first data bit $I_1$ is supplied to the encoder 57 over line 35 (FIG. 2) the output of $FF_{A_1}$, flip-flop 37, $FF_{B_2}$, flip-flop 41, and $FF_{C_3}$, flip-flop 43 are all zero. Upon the first bit $I_1$ being supplied the respective outputs of the flip-flops 37, 41, and 43 are 1 1 0. Upon the second bit being supplied, the respective outputs are 0 1 1 . Upon the third bit being supplied, the respective outputs are 1 1 1. Upon the fourth bit being supplied the respective outputs are 1 0 1. At this time, as was noted earlier, the control signal generator 85 (FIG. 2) generates a signal $t_c$ on line 55 causing feed-back AND gate 51 to open and AND gate 49 to close. This occurs because the Q outputs 101 of the flip-flops $C_1$, $C_2$, and $C_3$ represent at this time the encoding check bits for this particular data word. By opening the feed-back loop of the encoder 57 and causing AND gate 49 to effectively act as a closed switch, these check bits $C_1$, $C_2$, $C_3$ are serially shifted out and the encoded word introduced into the channel is, generally, $I_1$, $I_2$, $I_3$, $I_4$, $C_1$, $C_2$, $C_3$ and specifically 1 0 0 0 1 0 1.

This seven bit message is received from the channel 59 by the decoder 101 through AND gate 79 which is at this time acting as a closed switch and causes $FF_{D_1}$, flip-flop 61, $FF_{E_2}$, flip-flop 65, and $FF_{F_3}$, flip-flop 67 to respond in the following manner. Previous to receiving any bits of the message, the flip-flops all have zero outputs. After receiving the first bit $I_1$ flip-flop 61 has a "binary one" output, flip-flop 65 has a "binary one" output, flip-flop 67 has a "binary zero" output. After $I_2$ the respective outputs are 0 1 1. After $I_3$ the outputs are 1 1 1. After $I_4$, the outputs are 1 0 1. After $C_1$ the outputs are 0 1 0. After $C_2$ the outputs are 0 0 1. After $C_3$ the outputs are 0 0 0. While this information is being processed by the three flip-flops, each bit is being shifted into the shift register 87 through OR gate 83 so that by the time the last bit is processed the content of the shift register 87 is 1 0 1 0 0 0 1. This, of course, is the encoded data word transmitted if read from right to left and therefore, represents the occurrence of zero error during transmission.

Example A(2) of FIG. 3 illustrates what occurs when the encoded data word 1 0 0 0 1 0 1 is transmitted, but a single error occurs causing the message 1 0 0 1 1 0 1 to be received by the decoder 101. In such a case the flip-flops 61, 65, 67 in the decoder 101 will respond as shown by the state diagram labelled Decoder States (Q) (2). It can be seen that after the seventh clock time, the output of $FF_{D_1}$ flip-flop 61 is a "one," the output $FF_{E_2}$ flip-flop 65 is a "zero" and the output of $FF_{F_3}$ flip-flop 67 is a "one," thereby representing that an error has occurred in the transmission, since the outputs are not all zero at this point. Signal generator 85 is response to this condition produces an output signal $t_L$ on line 95 (FIG. 2) which enables AND gate 91 and disenables AND gate 79. This causes the contents of the shift register 87 which is 1 0 1 1 0 0 1 to shift end-around in the manner shown in the column labelled Decoder Register Contents (2), at the same time the contents of the $(n\text{-}k)$ register continues through its cycle. This end-around shifting of register 87 continues until the respective outputs of the flip-flops 61, 65, 67 are 0 0 1. At this time AND gate 73 has an output Y over line 99 which directs the control signal generator 85 to generate an output $t_e$ over line 33 which disenables AND gate 71 and enables AND gate 77. At the next clock time, therefore, as the next bit is being shifted out of the register 87, it is complemented by exclusive OR gate 89 and shifted end-around. The shifting procedure of register 87 continues for the remaining seven clock times at which time its contents are 1 0 1 0 0 0 1 which can be seen to be the encoded data word transmitted, the error that had occurred during transmission having been corrected.

FIG. 3 also illustrates the response of the apparatus of FIG. 2 to a different data word 1 0 1 0 both without an error, example B (1), occurring during the channel transfer and with an error, example B (2), occurring during the channel transfer. As can be seen from FIG. 2 and 3, it takes an extended amount of time and relatively complex circuitry and controls to process even a short seven bit cyclic encoded message in a totally serial manner.

Figure 4:
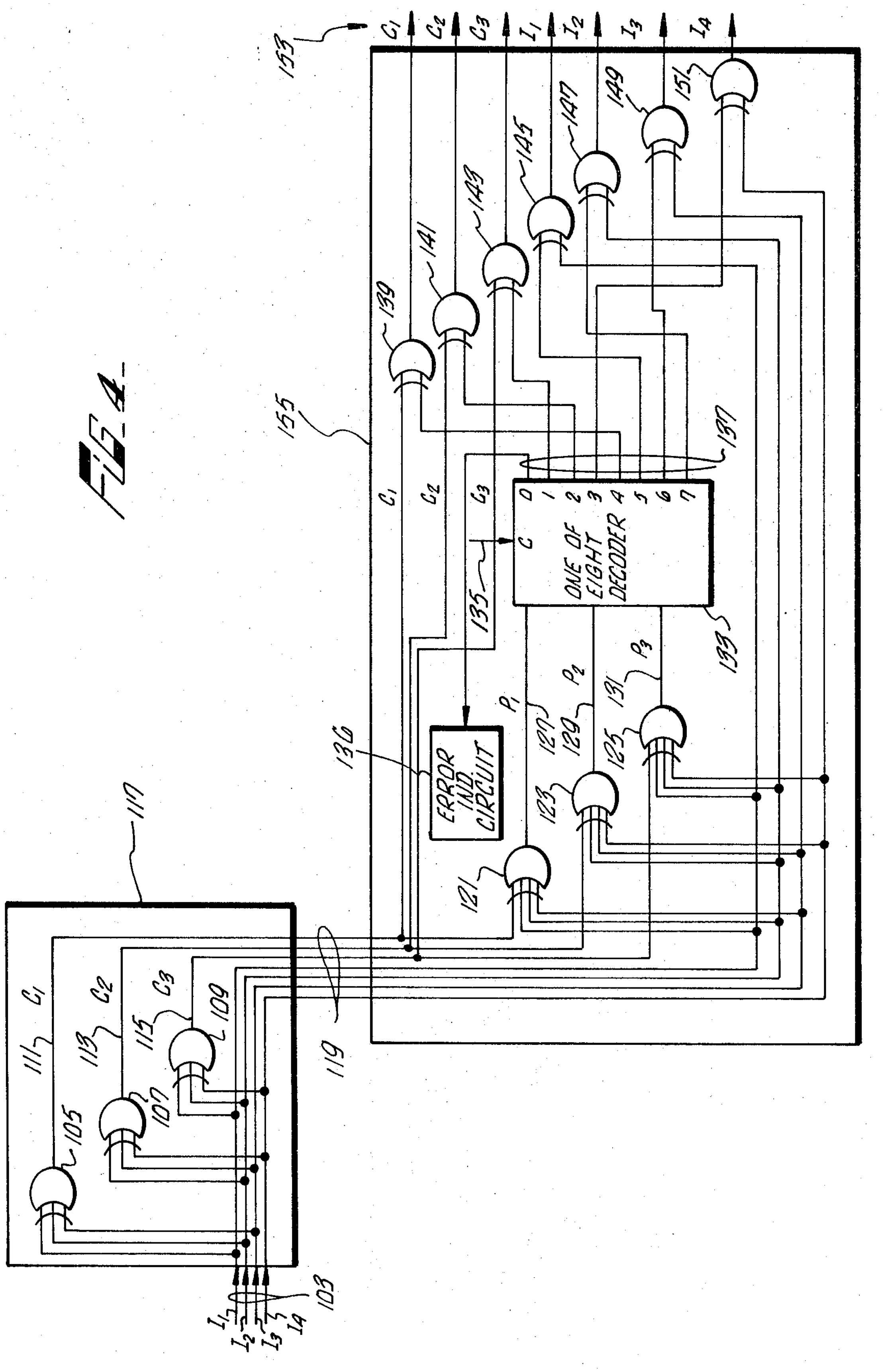
FIG. 4 is a block diagram illustrating a preferred embodiment of channel protection apparatus for a parallel transfer channel.

Referring now to FIG. 4, a preferred embodiment of my invention is illustrated implementing the same generating polynomial, $$g(x) = X^3 \oplus X \oplus 1,$$

that is implemented by the serial identity transformation channel protection apparatus of FIG. 2. The structure of the encoder 117 is determined by the general check bit equations for $C_1$, $C_2$, and $C_3$ that were derived above for a particular (7,4) cyclic code. The structure of the decoder 155 is determined by the error check bit equations for $P_1$, $P_2$, and $P_3$ that were derived above for the same code. The check bit and error check equations for any $(n,k)$ cyclic code can be obtained in the above manner.

Since any $(n,k)$ cyclic code can be implemented by an $(n-k)$ shift register encoder any $(n,k)$ cyclic code can be implemented in a totally parallel fashion in the manner to be described. As was shown above, the residue remaining in the $(n-k)$ shift register encoder after all the data bits have been processed represents the check bits for that data word. Each check bit is the result of the modulo two summation of certain data bits. What data bits must be modulo two summed to produce a certain check bit can be determined for each particular code by going through a general expression exercise, as above. The same is true for the error check bit equations. Once these check bit and error check bit equations have been determined, apparatus such as exclusive OR gates may be used to produce each check bit and error check bit required in the respective encoding and decoding stages.

Rather than going through a general expression exercise for each $(n,k)$ cyclic code to obtain the relationship between the data bits and the check bits and the relationship between the error check bits and the data bits and check bits, the following alternate method may be used. Each $(n-k)$ shift register encoder that implements a particular $(n,k)$ cyclic code has a basic cycle that is obtained by starting from the initial state 1 0 0 . . . 0 and operating until this initial state reoccurs.

Thus, for example, the basic cycle of the (7,4) shift register encoder of FIG. 2 which implements the generating polynomial $$g(x) = X^3 \oplus X \oplus 1$$

is:

1 0 0
0 1 0
0 0 1
1 1 0
0 1 1
1 1 1
1 0 1

The next state after 1 0 1 can be seen to be 1 0 0. The check bit and error check bit equation can be represented in a compact form called a parity generating and checking matrix. The matrix completely expresses the relationship between the check bits and data bits during encoding and the relationship between the error check bits and check bits and data bits during decoding.

The basic cycle of an $(n-k)$ shift register is the source of this matrix. The basic cycle is simply turned 90° counterclockwise. In other words the rows of the basic cycle became the columns, going left. Thus, the shift register of FIG. 2 that implements the generating polynomial $$g(x) = X^3 \oplus X \oplus 1$$

and has the above noted basic cycle will have the following parity generating and checking matrix:

| | $C_3$ | $C_2$ | $C_1$ | $I_4$ | $I_3$ | $I_2$ | $I_1$ |
|---|---|---|---|---|---|---|---|
| $P_1$ | 0 | 0 | 1 | 0 | 1 | 1 | 1 |
| $P_2$ | 0 | 1 | 0 | 1 | 1 | 1 | 0 |
| $P_3$ | 1 | 0 | 0 | 1 | 0 | 1 | 1 |

By labelling the rows and columns of the matrix as shown, the following relationships are expressed:

$C_1 = I_1 \oplus I_2 \oplus I_3$
$C_2 = I_2 \oplus I_3 \oplus I_4$
$C_3 = I_1 \oplus I_2 \oplus I_4$
$P_1 = C_1 \oplus I_1 \oplus I_2 \oplus I_3$
$P_2 = C_2 \oplus I_2 \oplus I_3 \oplus I_4$
$P_3 = C_3 \oplus I_1 \oplus I_2 \oplus I_4$ It can be seen that these relationships are identical to the ones obtained by operating the same encoder/decoder through a cycle in response to general data bit expressions. This method is much faster and will give the required correct relationships for any $(n,k)$ cycle code.

These equations govern the structure of a totally parallel implemented encoder and decoder as will now be explained in relation to FIG. 4. The parallel transfer channel 119 in FIG. 4 is protected by channel protection apparatus consisting of an encoder 117 and a decoder, error detector and corrector 155. The encoder 117 consists of an arrangement of exclusive OR gates 105, 107, and 109, the number of exclusive OR gates equalling the number of check bits to be generated. Since a (7,4) cyclic code is being used, three check bits $C_1$, $C_2$, and $C_3$ will be generated, as was the case by the serial implementation of FIG. 2. Check bit $C_1$ is produced on line 111 by exclusive OR gate 105 by the modulo two summing of data bits $I_1$, $I_2$, and $I_3$. Check bit $C_2$ is produced on line 113 by exclusive OR gate 107 by the modulo two summing of data bits $I_2$, $I_3$, and $I_4$. Check bits $C_3$ is produced on line 115 by exclusive OR gate 109 by the modulo two summation of data bits $I_1$, $I_2$, and $I_4$. These check bits are generated as the data bits pass through the encoder 117. They will be transmitted through the channel 119 to the decoder 155 concurrently with the transmission of the data bits.

The encoder 115 contains a plurality of exclusive OR gates 121, 123, 125, one exclusive OR gate for each error check bit to be generated. Each particular error bit $P_1$, $P_2$, $P_3$ is generated by the modulo two summation of a particular check bit and a particular plurality of data bits received. Therefore, error check bit $P_1$ is generated on line 127 by by exclusive OR gate 121 by the modulo two summation of check bit $C_1$ and data bits $I_1$, $I_2$, and $I_3$. Error check bit $P_2$ is generated on line 129 by exclusive OR gate 123 by the modulo two summation of check bit $C_2$ and data bits $I_1$, $I_3$, and $I_4$. Error check bit $P_3$ is generated on line 131 by the exclusive OR gate 125 by the modulo two summation of check bit $C_3$, and data bits $I_1$, $I_2$, and $I_4$. Error check bits $P_1$, $P_2$, and $P_3$ are supplied to a one of eight decoder 133.

The one of eight decoder 133 is well known in the art and will not herein be explained. It is presented here as a convenient device for decoding the example situation of a (7,4) cyclic code. If a larger $(n,k)$ code were being used, the function of the one of eight decoder, as will hereinafter be explained, may be performed by a read-only-memory which is capable of responding to more error check bit inputs and will be capable of generating an output bit pattern that is much longer.

Very briefly, the one-of-eight decoder functions in the following manner. The error check bit pattern at its input, in other words, the values of $P_1$, $P_2$, and $P_3$ at the input of the one-of-eight decoder, determine which output line 0 through 7 is a binary one while all the other lines are binary zero. The input signal on line 135 is the enable clock signal which may be generated by a system clock (not shown). The relationship of the input patterns to the output patterns may be as follows:

| INPUT | | | OUTPUT | | | | | | | |
|---|---|---|---|---|---|---|---|---|---|---|
| $P_1$ | $P_2$ | $P_3$ | 0 | 1 | 2 | 3 | 4 | 5 | 6 | 7 |
| 0 | 0 | 0 | 1 | 0 | 0 | 0 | 0 | 0 | 0 | 0 |
| 0 | 0 | 1 | 0 | 1 | 0 | 0 | 0 | 0 | 0 | 0 |
| 0 | 1 | 0 | 0 | 0 | 1 | 0 | 0 | 0 | 0 | 0 |
| 0 | 1 | 1 | 0 | 0 | 0 | 1 | 0 | 0 | 0 | 0 |
| 1 | 0 | 0 | 0 | 0 | 0 | 0 | 1 | 0 | 0 | 0 |
| 1 | 0 | 1 | 0 | 0 | 0 | 0 | 0 | 1 | 0 | 0 |
| 1 | 1 | 0 | 0 | 0 | 0 | 0 | 0 | 0 | 1 | 0 |
| 1 | 1 | 1 | 0 | 0 | 0 | 0 | 0 | 0 | 0 | 1 |

Thus it can be seen that whenever $P_1$, $P_2$, and $P_3$ are all zero indicating that no transmission error occurred, zero output line at 137 of the one-of-eight decoder 133 will have a binary one causing an error indicating circuit 136 to indicate that no error had occurred. Likewise, if $P_1$, $P_2$, $P_3$ are not all zero, then, the zero output line of the one-of-eight decoder 133 is not a one and error indication circuit 136 indicates than an error occurred during transmission.

The exclusive OR gates 139, 141, 143, 145, 147, 149, and 151 of the decoder 155 correct any single bit error occurring in the received encoded data word, as will be hereinafter explained. The corrected message then leaves the encoder 155 by lines 153.

Referring now to FIG. 5 for an illustration of the function of the apparatus of FIG. 4 in response to certain data bits $I_1$, $I_2$, $I_3$, $I_4$, example A(1) illustrates the transmission of the data bits 1 0 0 0. Before these data bits are inserted into the channel 119, encoder 117 generates check bits 1 0 1. The encoded data word transmitted, therefore is 0 0 0 1 1 0 1. The decoder 155 responds to this received word by generating error check bits 0 0 0. The one-of-eight decoder responds to these three error check bits with the bit pattern 1 0 0 0 0 0 0. The output 153 of the decoder 155, therefore, is 1 0 1 1 0 0 0. This case illustrates the transmission of data when no error occurs.

Example A(2) shows what happens when a single bit error occurs in the $I_4$ data position. Example A(3) illustrates what happens when a single bit error occurs in the $I_3$ data position. Example A(4) illustrates what happens when a single bit error occurs in the $I_2$ data position. Example A(5) illustrates what happens when a single bit error occurs in the $C_2$ check bit position. Example B(1) through B(5) illustrates similar occurrences with a different data word input. Thus, it can be seen that the apparatus of FIG. 4 will correct all single bit errors occurring in a received message word, whether it be in the check bits or in the data bits.

Figure 6:
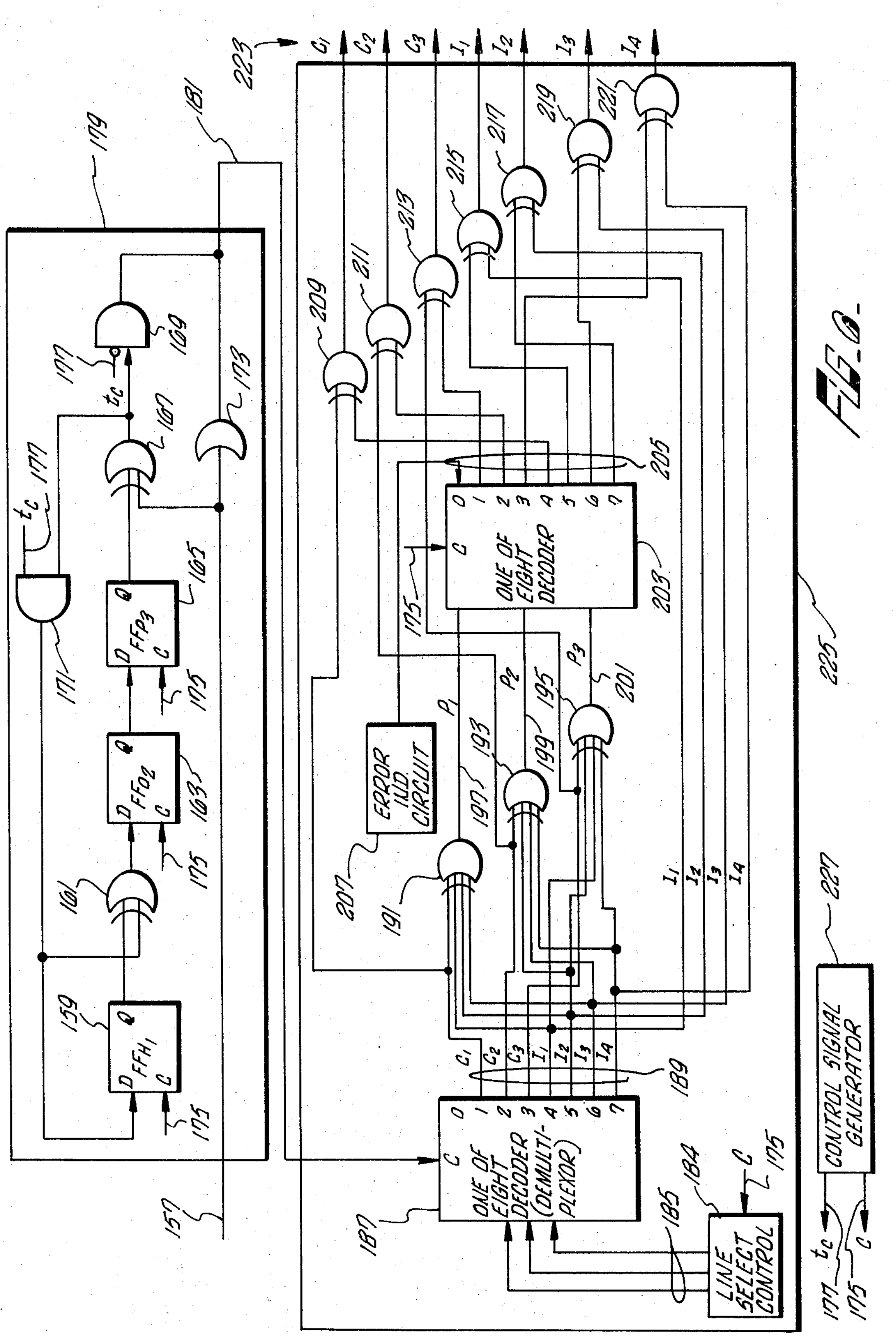
FIG. 6 is a block diagram of a preferred embodiment of channel protection apparatus for a serial transfer channel wherein the transferred data is decoded in a totally parallel manner.

Referring now to FIG. 6 which illustrates another embodiment of my invention, a serial transfer channel 181 is being protected by a serial encoding apparatus 179 and a parallel decoding apparatus 225. The encoding apparatus 179 is an $(n-k)$ shift register encoder structured to implement the generating polynomial $$g(x) = X^3 \oplus X \oplus 1$$

as was the situation in the $(n-k)$ shift register encoder of FIG. 2. It should be remembered that any appropriate generating polynomial may be used in this manner to generate a code that is in the class known as cyclic codes, the generating polynomial $$g(x) = X^3 \oplus X \oplus 1$$

being used only as an example.

The particular type of channel protection apparatus shown in FIG. 6, that is, a serial encoder with a parallel decoder, may be advantageously used to protect a serial transfer channel which may be used, for example, between a peripheral disk file system and a main computer. Thus, for example, channel 181 may be simply a transfer channel or transfer channel including storage. That is, the disk file system may be located somewhere in the channel 181 so that data received by the disk file system for storage is encoded by encoder 179, stored thereon, and during a retrieval cycle is recovered and transmitted to the system where the decoder 225 is located, which decoder communicates directly with the computer system. On the other hand, if the channel 181 is so chosen, it may be merely a transfer channel without storage wherein it functions merely as a communication link between the disk file system and the central computer.

The operation of the apparatus of FIG. 6 will now be explained in conjunction with the state diagrams of FIG. 7. Example A(1) of FIG. 7 illustrates the situation where the data bits $I_1$, $I_2$, $I_3$, and $I_4$ are 1 0 0 0 respectively. These data bits are delivered to the encoder 179 over line 157 in a serial manner and passed through OR gate 173 to the channel 181. As the first bit $I_1$ is being delivered to the decoder 179 it is modulo two summed with the output of $FF_{p_3}$ flip-flop 165 by exclusive OR gate 167. The output of this OR gate is supplied through AND gate 171, which is effectively a closed switch because of signal $t_c$ on line 177, supplied by the control signal generator 227 to the input of $FF_{H_1}$ flip-flop 163 through exclusive OR gate 161. At the next clock time, the $Q$ outputs of these flip-flops go to the 1 1 0 state respectively, $FF_{P_3}$ flip-flop 165 remaining in the zero state. The cycle continues as shown in FIG. 7 until the last data bit $I_4$ has been delivered to the encoder 179, at which time the $t_c$ signal generated by the control signal generator 227 changes, thereby enabling AND gate 169 and opening the feedback loop by disenabling AND gate 171. The outputs of the flip-flops 159, 163, and 165, respectively, are 1 0 1 at this point. These bits represent, as was heretofore explained, the check bits. By enabling AND gate 169 and disenabling the feed-back in the $(n-k)$ register encoder 179, these check bits are shifted out serially and appended to the four data bits $I_1$, $I_2$, $I_3$ and $I_4$ that have already been transmitted to the decoder 225 by way of the channel 181. The encoder output, therefore, as shown in FIG. 7 is 1 0 0 0 1 0 1.

This message is received serially by demultiplexor 187 in the decoder 225. The demultiplexor 187 is here shown to be a one-of-eight decoder because the particular code chosen is a (7,4) cyclic code. However, if a larger code were being used, a read-only- memory could be utilized in its stead. As each bit is received by the demultiplexor 187, a line select control circuit 184 directs the bit to its respective output line 1 through 7 at 189 of the demultiplexor 187. Thus, for example, the first bit $I_1$ received is directed to output line 4 at the demultiplexor output 189. The second data bit $I_2$ is routed to line 5. The third data bit $I_3$ is routed to line 6. The fourth data bit $I_4$ is routed to line 7. The first check bit $C_1$ is routed to line 1. The second check bit $C_2$ is routed to line 2. The third check bit $C_3$ is routed to line 3. The data pattern on lines 185 of the line select control circuit determines the line selected. The demultiplexor 187 retains each received message bit in its respective location until the entire message has been received from channel 181 whereupon the 7 bit message is placed on the output lines 189 for decoding by the exclusive OR gates 191, 193, and 195.

The output of the demultiplexor, at this time, will be 1 0 1 1 0 0 0. The $P_1$ output on line 197 of exclusive OR gate 191 in response thereto will be a zero. The $P_2$ output on line 199 of exclusive OR gate 193 will be a zero. This error check pattern is supplied to one-of-eight decoder 203 which responds thereto by generating a binary one output on its zero line output at 205 causing an error indication circuit 207 to indicate no error. However, if the error check bit pattern $P_1$, $P_2$, and $P_3$ had not been all zeros the one-of-eight decoder 203 would have a different output pattern on lines 205, as previously described, causing error indication circuit 207 to indicate an error and causing a particular one of the exclusive OR gates 209, 211, 213, 215, 217, 219, and 221 to correct the particular bit in error. The output 223 of the decoder 225 will then be corrected whenever a single error bit has occurred in the transmission channel 181.

Figure 8:
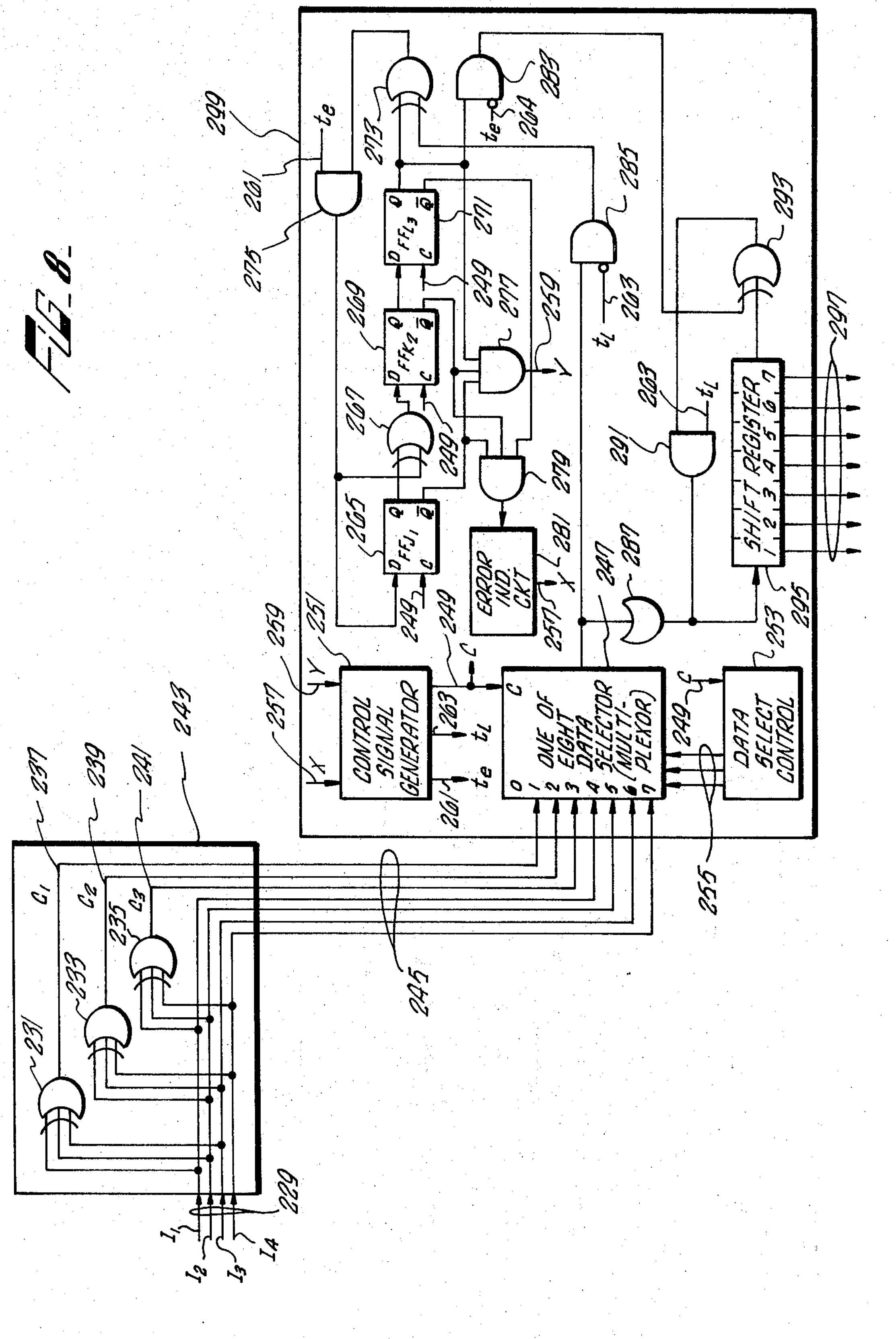
FIG. 8 is a block diagram of a preferred embodiment of channel protection apparatus for a parallel transfer channel wherein the data to be transferred is encoded in a totally parallel manner and decoded serially.

Referring now to FIG. 8, a parallel transmission channel 245 is protected by parallel encoding apparatus 243 and serial decoding apparatus 299. As the data bits $I_1$, $I_2$, $I_3$ and $I_4$ are inserted into the encoder 243 check bit $C_1$ is generated by exclusive OR gate 231 on line 237 by modulo two summing of data bits $I_1$, $I_2$, and $I_3$. Check bit $C_2$ is generated by exclusive OR gate 233 on line 239 by the modulo two summing of data bits $I_2$, $I_3$, and $I_4$. Check bit $C_3$ is generated by exclusive OR gate 235 on line 241 by the modulo two summation of check bits $I_1$, $I_2$, and $I_4$. The encoded data word being inserted into the channel 245 therefore, is $C_1$, $C_2$, $C_3$, $I_1$, $I_2$, $I_3$, $I_4$. These bits are received in parallel by the decoder 199. The encoded data word is first received by a multiplexor 247 in the decoder which multiplexes the received data word onto its output line according to the signals on control circuit 253. The received multiplexed message is thereby serially shifted to the $(n-k)$ shift register composed of $FF_{J_1}$ flip-flop 265, $FF_{K_2}$ flip-flop 269 and $FF_{L_3}$ flip-flop 271 through AND gate 285, which at this time is effectively a closed switch.

Each bit of the message received is modulo two summed with the $Q$ output of $FF_{L_3}$ flip-flop 271 by exclusive OR gate 273 and fed back to flip-flop 265 through AND gate 275, which this time is acting as a closed switch because of the signal $t_c$ on line 261, supplied by a control signal generator 251. The states of the flip-flops 265, 269, and 271 in response to the data message 1 0 0 0 1 0 1 is illustrated in FIG. 9. After the last bit in the message has been supplied to exclusive OR gate 273, shift register 295, therefore being full, the control signal generator 251 will generate a signal $t_L$ to disenable AND gate 285 and enable AND gate 291 only if the output signal X on line 257 of the error indication circuit 281 indicates to the control signal generator 251 that an error has occurred. Such will be the case, if the inputs to AND gate 279 are not all binary ones. AND gate 277 detects when the flip-flops 265, 269, and 271 are in a 0 0 1 state, respectively. Upon detecting this condition, it produces a signal on line 259 which instructs the control signal generator 251 to generate a signal $t_c$ on line 261 to disenable AND gate 275 and enable AND gate 283. The data bit being shifted out of shift register 295 at this time will be complemented by exclusive OR gate 293 and fed back-around into the first stage of the shift register 295. The shifting cycle of the shift register will continue until the contents of the shift register has been completely shifted once around. At this time, the content of the shift register is the corrected data message, which may be read out either in parallel over lines 197 or shifted out serially, in a manner well known (not shown).

FIG. 9 illustrates the states of the various elements in the encoder and decoder of FIG. 8 in response to the data word 1 0 0 0 when transmitted without error and when transmitted with an error occurring at the $I_4$ bit position. FIG. 10 is another state diagram illustrating the response of the encoder and decoder of FIG. 8 to the data word 1 0 1 0 transmitted without error and when transmitted with a single bit error occurring at its $I_2$ position.

Figure 11:
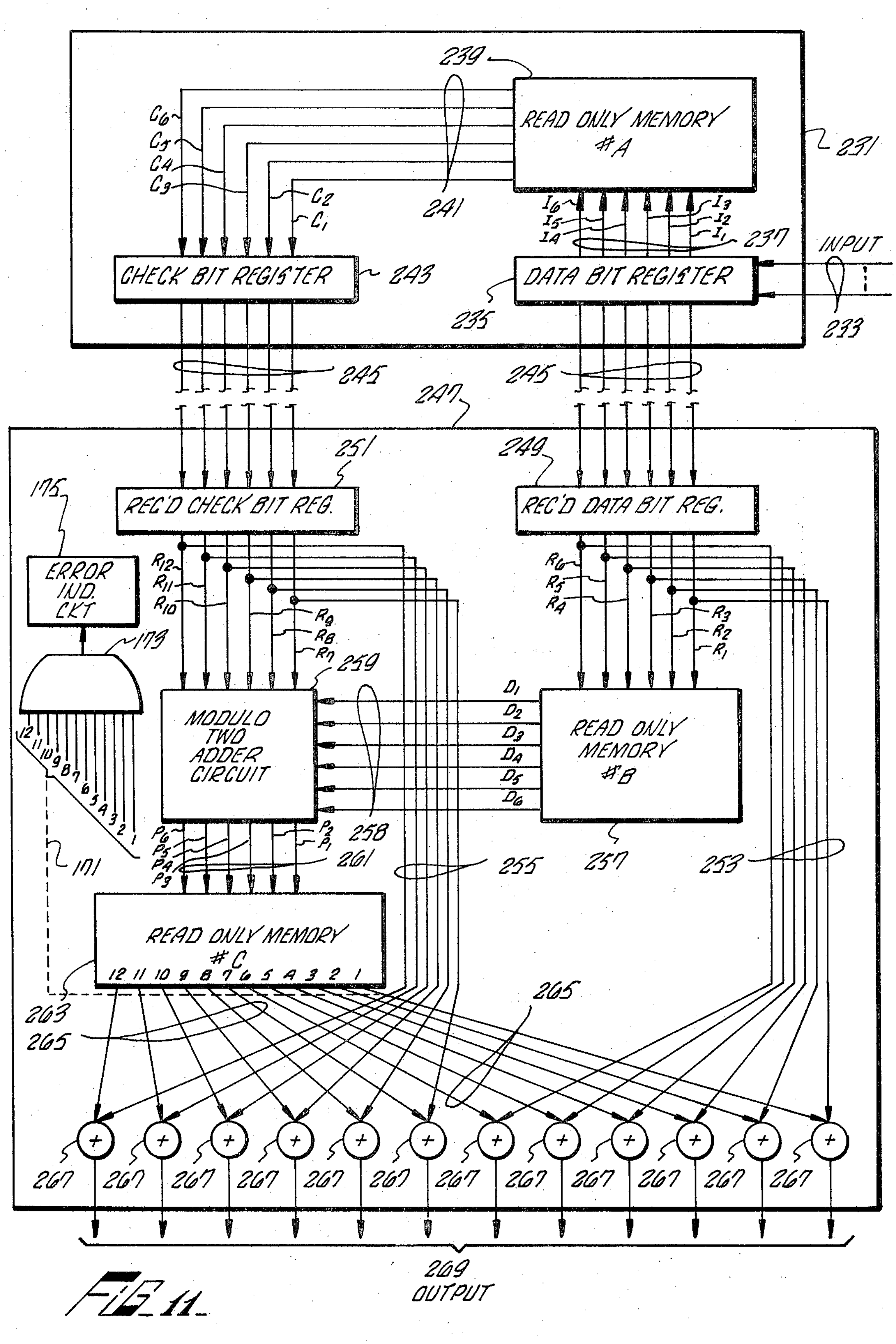
FIG. 11 is a block diagram of another preferred embodiment of channel protection apparatus for a parallel transfer channel.

Referring now to FIG. 11, parallel channel protection apparatus comprising an encoder 231 and a decoder 247 are shown for implementing a cyclic $(n,k)$ code having the capability of detecting and correcting bursts of errors. The particular example chosen has a generating polynomial.

$$g(x) = X^6 \oplus X^5 \oplus X^4 \oplus X^2 \oplus X + 1.$$

This specific code of a class within the cyclic codes, commonly known as a Fire Code, has the capability of detecting all burst errors six bits long or less, and correcting all burst errors two bits long or less. The parallel implementation of this specific example is obtained from the basic cycle of an $(n-k)$ shift register constructed to implement the above generating polynomial. The structure of the (*n–k*) register follows the relationships explained above. It will consist of six *D*-type flip-flops wherein the output of the last flip-flop in the string is fed to an exclusive OR gate, the output of this gate being, in turn, supplied to the inputs of all the preceding flip-flops through an exclusive OR gate, except the first flip-flop in the string which receives this output directly and the fourth flip-flop in the string which does not receive this input at all.

The basic cycle of this specific (*n–k*) shift register is

| | | | | | |
|---|---|---|---|---|---|
| 1 | 0 | 0 | 0 | 0 | 0 |
| 0 | 1 | 0 | 0 | 0 | 0 |
| 0 | 0 | 1 | 0 | 0 | 0 |
| 0 | 0 | 0 | 1 | 0 | 0 |
| 0 | 0 | 0 | 0 | 1 | 0 |
| 0 | 0 | 0 | 0 | 0 | 1 |
| 1 | 1 | 1 | 0 | 1 | 1 |
| 1 | 0 | 0 | 1 | 1 | 0 |
| 0 | 1 | 0 | 0 | 1 | 1 |
| 1 | 1 | 0 | 0 | 1 | 0 |
| 0 | 1 | 1 | 0 | 0 | 1 |
| 1 | 1 | 0 | 1 | 1 | 1 |

By rotating this basic cycle pattern 90° counterclockwise, the parity generating and checking matrix, which defines the check bit and error check bit equations, is formed. This matrix is:

| | $C_6$ | $C_5$ | $C_4$ | $C_3$ | $C_2$ | $C_1$ | $I_6$ | $I_5$ | $I_4$ | $I_3$ | $I_2$ | $I_1$ |
|---|---|---|---|---|---|---|---|---|---|---|---|---|
| $P_1$ | 0 | 0 | 0 | 0 | 0 | 1 | 1 | 0 | 1 | 0 | 1 | 1 |
| $P_2$ | 0 | 0 | 0 | 0 | 1 | 0 | 1 | 1 | 1 | 1 | 0 | 1 |
| $P_3$ | 0 | 0 | 0 | 1 | 0 | 0 | 0 | 1 | 0 | 0 | 0 | 1 |
| $P_4$ | 0 | 0 | 1 | 0 | 0 | 0 | 1 | 0 | 0 | 0 | 1 | 1 |
| $P_5$ | 1 | 0 | 0 | 0 | 0 | 0 | 1 | 1 | 0 | 1 | 0 | 1 |
| $P_6$ | 1 | 0 | 0 | 0 | 0 | 0 | 1 | 1 | 0 | 1 | 0 | 1 |

This matrix, defines all the check bit equations and error check bit equations needed to construct the parallel implementation of the cyclic code specified by the generating polynomial *g*(X), above recited. For example, check bit $C_1$ is generated by the modulo two summation of $I_6$, $I_4$, $I_2$, and $I_1$ and error check bit $P_3$ is generated by the modulo two summation of $C_3 \oplus I_5 \oplus I_1$. In this way, all the check bit equations and all the error check bit equations may be obtained and used to structure the apparatus of FIG. 11 as will be hereinafter explained.

The embodiment of FIG. 11 does not illustrate control circuitry and timing signals for operating the various read-only-memories and registers since they are seen as well within the purview of a person of ordinary skill in the art, and therefore, not necessary of explanation herein. The structure will generally function in the following manner.

Input lines 233 deliver information bits $I_1$ through $I_6$ to a data bit register 235 in the encoder 231. The received data bits are transmitted to # A read-only memory 239 which responds to these data bits on line 237 as a memory would to address bits. The memory output on lines 241 will be the check bit pattern $C_1$ through $C_6$ that is peculiar to the data word $I_1$ through $I_6$ received.

The correct peculiar check bit pattern is retrieved by storing within the read-only memory, the peculiar check bit pattern for each data bit word that could be received so that each data bit word addresses its peculiar check bit pattern when submitted to the read-only memory 239.

FIG. 12 illustrates examples of certain data bit words $I_1 - I_6$ being processed by the apparatus of FIG. 11. Example 1 illustrates that for the data bit word 1 0 1 0 0 0 the peculiar check bit pattern is 1 0 1 0 0 0. This check bit pattern is calculated from the parity generating and checking equations defined by the above matrix. Continuing with the specific example of a data bit word 1 0 1 0 0 0, having generated the check bit pattern 1 0 1 0 0 0, the encoded word 1 0 1 0 0 0 1 0 1 0 0 0 is thus passed into the channel 245, the data bits being separated from the check bits as shown in FIG. 11. The data bits are received in the decoder 247 by a receive data bit register 249. The check bits are received by a receive check bit register 251.

The received data bit register 249 supplies the received data bits to # B read-only memory 257 which is identical in its contents to # A read-only memory 239. Thus, the output signals on lines 258 of # B read-only memory 257 is a decoded check bit pattern $D_1$ through $D_8$ which, for example 1 of FIG. 12, is 1 0 1 0 0 0. This decoded check bit pattern is supplied to the modulo two adder circuit 259 which sums the output of received check bit register 251 with the decoded check bit pattern from # B read-only memory 257 to produce the error check bit pattern $P_1$ through $P_6$. In other words, each check bit in receive check bit register 251 is compared with its respective check bit generated by read-only memory 257. If all comparisons are favorable, the error check bit pattern $P_1$ through $P_6$ on line 261 is all zeros. This error check bit pattern addresses # *C* read-only memory 263, the contents of which are a plurality of 12-bit error correction patterns expressed by the parity checking and generating matrix. In other words, each specific error check bit pattern $P_1$ through $P_6$ has a specific 12-bit pattern that is read out of # *C* read-only memory 263 in response thereto. The 12-bit error correcting pattern, for example 1 of FIG. 12, is all zeros, indicating no error occurred during transmission.

The check bits $R_7 - R_{12}$ received by check bit register 251 are supplied to exclusive OR gates 267 over lines 255 and the data bits $R_1 - R_6$ received by data bit register 249 are supplied to the exclusive OR gates 267 over lines 253. The signal outputs 269 of these gates, will not be different from their inputs if the output signals on lines 1 – 12 of the # C read-only memory 263 is all zeros. The outputs of the # C read-only memory 263 are coupled by way of line 171 to the multiple input AND gate 173, which has an output signal whenever an uncorrectable error condition occurs. An uncorrectable error check bit pattern causes read-only memory # *C* to have a 1 on each of its 12-output lines 265.

Reference is now made to example 4 of FIG. 12 which illustrates what happens when a double adjacent error occurs during the transmission of the data bits 1 0 1 0 0 0 0. Assume for purposes of example that out of the data bits received, bits $I_4$, $I_5$ are in error. The received data bits are introduced to # *B* read-only memory 257 and in response thereto decoded check bits 1 0 0 0 0 1 1 are generated. These decoded check bits are compared with the received check bits $R_7 - R_{12}$ which are 1 0 1 0 0 0. The comparison yields an error pattern of 1 0 1 0 1 1 which when supplied to the # C read-only memory 273 generates an error correction pattern of 0 0 0 1 1 0 0 0 0 0. Therefore, outputs 4 and 5 of # C read-only memory 263 are "binary ones." The received check bits when supplied to the exclusive OR gates 267 over lines 255 and the received data bits when supplied to the exclusive OR gates over lines 253 will be unaltered except for data bits $R_4$ and $R_5$ which will be complemented and thereby corrected. The data word output will then be 1 0 1 0 0 0 1 0 1 0 0.

It can be seen from FIG. 12 that example 1 illustrates the coding of the data bit word 1 0 1 0 0 0 and what occurs when that encoded word is transmitted without error. Example 2 illustrates what happens when that same data word is transmitted with a single bit error occurring in the $R_6$ position of the received data. Example 3 illustrates what happens when that same data word is transmitted with a single bit error occurring in the $R_6$ position of the received data. Example 3 illustrates what happens when the same word is transmitted and an error occurs in the $R_{10}$ check bit position of the received bits. Example 4 illustrates what happens to the same word when a double error occurs in the $R_4$ and $R_5$ position of the received data bits. Example 5 illustrates what happens when a double error occurs in the $R_9$ and $R_{10}$ check bit position. Example 6 illustrates what happens to the same word when a five-bit error burst occurs. In response to an error check bit pattern $P_1$ through $P_6$ that indicates an error burst greater than two bits long, the # C read-only memory 263 is programmed to read out a pattern of all "1's" which actuates AND gate 173 to cause an error indication circuit 175 to indicate an uncorrectable error has occurred.

From the foregoing discussion, it can be seen that the present invention provides for coding and decoding apparatus that can relatively inexpensively and very efficiently encode and decode digital data by using cyclic codes implemented in a totally parallel manner. Such capability further provides a relatively inexpensive and uncomplicated information channel protection apparatus that can encode digital data serially and decode it in parallel and vice versa. Obviously, many modifications and variations of the present invention are possible in light of the above teachings. It is, therefore, to be understood that within the scope of the appended claims, the invention may be practiced otherwise than as specifically described.

What is claimed is:

1. Apparatus for protecting data in a communication channel from errors by use of $(n, k)$ cyclic polynomial codes having generating polynomial $g(x)$, wherein $n$ is the total number of bits in an encoded word and $k$ is the total number of information bits in an encoded word, comprising:

a parallel network of $(n - k) = r$ modulo-two gating means for encoding said $k$ information bits to be inserted into said channel by forming a parallel codeword of $k$ information bits plus $r$ check bits, each check bit being generated in response to the modulo-two combination of certain $k$ data bits, the particular $k$ data bits used for each combination being determined by the $k$ data bit residue in the stage, that generates the respective check bit, of an $(n - k)$ stage shift register, upon having received the last of the $k$ data bits to be encoded, said $(n - k)$ stage shift register being constructed in accordance with the generating polynomial $g(x)$ of the particular cyclic code chosen;

a parallel network of $(n - k) = P$ modulo-two gating means for receiving said codeword containing $n$ bits and generating $P$ error check bits, each error check bit being generated in response to the modulo-two combination of certain $k$ data bits and a certain $r$ check bit, the particular $k$ data bits and particular $r$ check bit used for each combination being determined by the $k$ data bit and $r$ check bit residue in the stage, that generates the respective error check bit, of an $(n - k)$ stage shift register, upon having received the last of the $n$ data bits, said $(n - k)$ stage shift register being constructed in accordance with the generating polynomial $g(x)$ of the particular cyclic code chosen;

means responsive to the $P$ error check bits for generating an $n + 1$ bit wide pattern that indicates the bit in error in said received $n$ bit codeword, or indicates a lack of errors when said $n$ bit codeword is error-free; and a parallel network of $n$ modulo-two gating means, each gating means receiving a different bit of said received $n$ bit codeword, said network being responsive to said $n + 1$ bit wide bit pattern generating means for correcting errors in said received $n$ bit codeword.

2. The apparatus of claim 1 wherein said $n + 1$ bit wide bit pattern generating means comprises a one of eight decoder.

3. Apparatus for protecting data in a serial communication channel from errors by use of $(n, k)$ cyclic polynomial codes having generating polynomial $g(x)$, where $n$ is the total number of bits in an encoded word and $k$ is the total number of information bits in an encoded word, comprising:

an $(n - k)$ stage shift register encoder structured in accordance with said generating polynomial $g(x)$ for encoding $k$ data bits to be inserted into said channel by forming a codeword of $k$ data bits and $r$ check bits;

demultiplexing means receiving said $k + r$ codewords and formatting each of them into a parallel $k + r = n$ bit wide codeword;

a parallel network of $(n - k) = P$ modulo-two gating means for receiving said parallel $k + r = n$ bit wide codeword and generating P error check bits, each error check bit being generated in response to the modulo-two combination of certain $k$ data bits and a certain $r$ check bit, the particular $k$ data bits and particular $r$ check bit used for each combination being determined by the $k$ data bit and $r$ check bit residue in the stage, that generates the respective error check bit, of an $(n - k)$ stage shift register, upon having received the last of the $k + r = n$ data bits, said $(n - k)$ stage shift register being constructed in accordance with the generating polynomial $g(x)$ of the particular cyclic code chosen;

means responsive to the $P$ error check bits for generating an $n + 1$ bit wide bit pattern that indicates the bit in error in said received $k + r = n$ bit codeword, or indicates a lack of errors when said $k + r = n$ bit codeword is error-free; and a parallel network of $k + r$ modulo-two gating means, each gating means receiving a different bit of said received $k + r = n$ bit codeword, said network being responsive to said $n + 1$ bit wide bit pattern generating means for correcting errors in said received $k + r = n$ bit codeword.

4. The apparatus of claim 3 wherein said $n + 1$ bit wide pattern generating means comprises a one of eight decoder.

5. Apparatus for protecting data in a parallel communication channel from errors by use of $(n, k)$ cyclic polynomial codes having generating polynomial $g(x)$, wherein $n$ is the total number of bits in an encoded word and $k$ is the total number of information bits in an encoded word, comprising:

a parallel network of $(n - k) = r$ modulo-two gating means for encoding said $k$ information bits to be inserted into said channel by forming a parallel codeword of $k$ information bits plus $r$ check bits, each check bit being generated in response to the modulo-two combination of certain $k$ data bits, the particular $k$ data bits used for each combination being determined by the $k$ data bit residue in the stage, that contains the respective check bit, of an $(n - k)$ stage shift register, upon having received the last of the $k$ data bits to be encoded, said $(n - k)$ stage shift register being constructed in accordance with the generating polynomial $g(x)$ of the particular cyclic code chosen;

multiplexing means receiving said $k + r$ parallel codewords and formatting each of them into a serial $k + r = n$ bit codeword; and an $(n - k)$ stage shift register decoder structured in accordance with said generating polynomial $g(x)$ for decoding said serial codeword containing $n$ bits.

6. Apparatus for protecting data in a communication channel from errors by use of $(n, k)$ cyclic polynomial codes having generating polynomials $g(x)$, wherein $n$ is the total number of bits in an encoded word, and $k$ is the total number of information bits in an encoded word, comprising:

first register means for receiving $k$ information bits to be inserted into said channel;

first memory means responsive to said $k$ information bits addressing said first memory means for supplying $r$ check bits, the $r$ check bit pattern stored in said first memory means for a particular $k$ information bit pattern being the check bit pattern generated by an $(n - k)$ stage shift register encoder upon having received the last of the $k$ information bits to be encoded, said $(n - k)$ stage shift register being constructed in accordance with the generating polynomial $g(x)$ of the particular cyclic code chosen;

second register means for receiving k information bits and $r$ check bits;

second memory means responsive to the received $k$ information bits addressing said second memory means for supplying $d$ check bits, the $d$ check bit pattern stored in said second memory means for a particular $k$ information bit pattern being the check bit pattern generated by an $(n - k)$ stage shift register encoder upon having received the last of the $k$ information bits to be encoded, said $(n - k)$ stage shift register being constructed in accordance with the generating polynomial $g(x)$ of said particular cyclic code chosen;

a parallel network of $r = d$ modulo-two gating means, each modulo-two gating means receiving an $r$ check bit from said register means and the respective $d$ check bit from said second memory means, said parallel network generating a $P = r = d$ error check bit pattern;

a third memory means responsive to said $P$ error check bit pattern for supplying a $k + r = n$ bit long pattern when addressed by said $P$ error check bit pattern, said bit pattern indicating the bits in error in the $k + r$ bit codeword received by said second register means; and a parallel network of $(k + r) = n$ modulo-two gating means, each modulo gating means receiving a bit from the bit pattern supplied by said third memory means and a bit from the $k + r$ bits received by said second register means, said network correcting the received $k + r$ bits to the extent dictated by said cyclic polynomial code chosen.

* * * * *